United States Patent

Hieber et al.

[11] Patent Number: 4,486,173
[45] Date of Patent: Dec. 4, 1984

[54] HIGH-TEMPERATURE, HIGH-PRESSURE WORKPIECE TREATMENT SYSTEM

[75] Inventors: Ernst Hieber, Renningen; Hans-Dieter Kaden, Reutlingen; Helmut Martini, Weil der Stadt; Gerhard Ziegler, Stuttgart, all of Fed. Rep. of Germany

[73] Assignee: Robert Bosch GmbH, Stuttgart, Fed. Rep. of Germany

[21] Appl. No.: 461,186

[22] Filed: Jan. 26, 1983

[30] Foreign Application Priority Data

Feb. 12, 1982 [DE] Fed. Rep. of Germany ....... 3204994

[51] Int. Cl.³ .................... F27B 5/04; F27B 9/40; F27D 1/16; F23C 11/04
[52] U.S. Cl. ........................... 432/205; 431/1; 432/3; 432/34
[58] Field of Search .................... 432/3, 34, 205, 206; 431/1

[56] References Cited

U.S. PATENT DOCUMENTS 2,269,595  1/1942  Miller ........................... 432/205
3,432,912  3/1919  Doherty, Jr. et al. ............ 29/470.1
4,069,004  1/1978  Sayous ........................... 431/1

FOREIGN PATENT DOCUMENTS

WO81/00819  4/1981  PCT Int'l Appl.
600192       4/1975  U.S.S.R. ........................ 432/205

Primary Examiner—John J. Camby
Attorney, Agent, or Firm—Frishauf, Holtz, Goodman & Woodward

[57] ABSTRACT

To permit installation of various sizes of deburring chambers, matched to particular sizes, or combination of sizes of workpieces, so that only the minimum size chamber for the particular quantity or size of workpiece need be used, the chambers are provided in sets with adapters so that a single machine frame can be utilized, the adapters and chambers being fitted within the machine frame so that the lower edge (13a, 13'a) of any one of the chambers is within the closing or sealing stroke of a closing plate (14) carrying the workpieces. A coding system, for example coding bolts (16) is secured to each one of the chambers, to be scanned by a reading head (17) and transmitting information relative to the appropriate fill quantity and pressure of gases for the particular chamber then being installed in the machine.

8 Claims, 3 Drawing Figures

HIGH-TEMPERATURE, HIGH-PRESSURE WORKPIECE TREATMENT SYSTEM

Reference to related applications, assigned to the assignee of the present invention:

U.S. Ser. No. 461,185, filed Jan. 26, 1983, MARTINI;

U.S. Ser. No. 461,184, filed Jan. 26, 1983, DREXEL et al; U.S. Ser. No. 464,904, filed Feb. 8, 1983, DREXEL et al.

The present invention relates to a high-temperature high-pressure workpiece treatment system and more particularly to deburring apparatus in which combustion chambers capable of acepting substantial temperatures and pressures are used to deburr workpieces upon introduction of an explosive mixture of a combustion gas and oxygen.

BACKGROUND

Deburring chambers are used for thermal deburring. Under the influence of heat and pressure, a chemical process starts in which burrs, flashings, and other imperfections are burned off, and thus removed upon subjecting the workpiece to a temperature and pressure shock. The required temperature shock is generated by combusting the mixture of combustion gas and oxygen. It is necessary to compress the gas mixture before combustion in order to obtain the necessary energy. The deburring effect is increased if the energy, and hence the pressure is increased. Combustion temperatures which occur within the chamber during combustion are in the range of between about 2500° to 3500° C. With increase of pressure, the amount of heat per volume-unit liberated by the combustion is also increased. The pressures within the combustion chamber before combustion, that is, the pressure of the combustion gas-oxygen mixture is in the order of about 40 bar.

Known apparatus to treat workpieces in a combustion chamber, particularly for thermal deburring, utilize deburring chambers of various sizes. Deburring chambers having diameters of about 17 cm, 20 cm, 25 cm with a height of about 15 cm are used. Such chambers are introduced into frame structures which generally have a C-frame, that is, one upright member secured to a base and a top laterally projecting element. It is also known to utilize deburring apparatus which are constructed in "portal" form, that is, two upright members with a cross piece on top secured to a base, that is, generally in the shape of an inverted U. When using chambers in this "portal" construction, diameters of up to about 32 cm, with a height of 30 cm can be used.

The size of the deburring chamber to be employed depends on the workpiece to be treated, or the quantity of small workpieces. The required energy also depends on the size of the chamber. It is desirable to have the dead space within the chamber, that is, that volume which is not taken up by the workpiece as small as possible to utilize the combustion gases and oxygen most efficiently.

In accordance with structures which are presently available, the size of the machine frame is matched to the size of the deburring chamber. Thus, a deburring system with a small deburring chamber has lower vertical columns than one with an axially larger chamber. Consequently, various machine frames are needed for the various deburring chambers. The flexibility of use of such apparatus, thus, is low. It is uneconomical to operate a deburring chamber of larger size than necessary for the workpiece if a smaller deburring chamber would be sufficient. The larger chamber has a higher energy consumption. It has been determined that it would be commercially and economically desirable to utilize different sizes of deburring chambers for different operations, that is, to carefully match the quantity and nature of workpieces to the size of the chamber being used.

The invention: It is an object of the present invention to provide a thermal and high-pressure article treatment system in which the overall energy consumption is only such as is absolutely necessary for treatment of the workpieces, and in which the size of combustion chambers can be adapted to the quantity, or size of the workpiece to be treated.

Briefly, the apparatus is constructed in form of the "U" configuration, that is, two vertical support columns with a cross member secured to a base. A worktable is moveable upwardly towards a chamber suspended from the cross element. In accordance with the invention, a set of essentially bell or inverted cup-shape chamber structures is provided, each structure fitting within the frame. A set of adapters is provided, which are located between the respective chamber of the set and the upper cross element of the frame to permit positioning the lower edge of the chamber structure at an approximately uniform height with respect to the worktable, regardless of the axial length of the specific chamber structure then being used.

By providing a set of chambers, and a set of adapters, which are mutually matched to each other and to the frame structure, the apparatus is substantially more versatile in use; the respective working chamber can be quickly installed and exchanged for another one if a different workpiece is to be treated. Optimum working conditions, and minimum operating costs will pertain. The utilization of fuel gas, and oxygen is minimized, and the liberated energy is efficiently used.

In accordance with the present invention, any size of workpiece, or combination of workpieces is matched to the optimum size of the chamber. Only a single machine frame is used, capable, however, of receiving the various chambers of the set. Differences in dimensions are then compensated for by the set of adapters. Consequently, the machine frame, designed for the largest one of the chambers to be utilized can be used for various other chambers, of smaller axial lengths, for example. For the largest chamber, no adapter need be used.

If a small working chamber is all that is needed, a suitably dimensioned and matched adapter is used, for example in the form of an intermediate adapter ring, in order to match the smaller combustion chamber to the machine frame. The length of the adapter is increased as the chamber decreases. Thus, each chamber has an appropriate associated adapter. It is, thus, possible to install a single treatment apparatus, and, nevertheless, handle small workpieces economically and efficiently.

The adapters preferably have suitably fitted connecting flanges and centering surfaces, so arranged and positioned that the overall system can readily be changed over for use of the most appropriate treatment chamber.

The system has the additional advantage that, in accordance with the preferred feature of the invention, it can readily be utilized with a well-known coding system. Since various working chambers of various diameters can be used, the filling quantity, and the filling pressure must be matched to the size of the working chamber. This, also, controls the explosion pressure.

The effect of deburring is increased as the pressure in the working chamber increases. In accordance with a feature of the invention, a coding system is used which is secured to, or associated with the respective working chambers and is used as an information transfer system for the gas metering and gas pressuring pressurization device, so that the appropriate quantity of oxygen and combustion gas is supplied with the appropriate pressure for the particular combustion chamber then installed in the machine. Each one of the combustion chambers of the set thus is characterized by the particular code used, so that the treatment process can be matched to the particular chamber size then in use. Thus, every chamber will receive the appropriate quantity of combustion gas and oxygen, with the appropriate pressure, so that the mixture will have the appropriate concentration at the appropriate pressure. This is also of importance since the metering cylinders will supply only so much of the respective gas as is necessary to fill the chamber. This is a safety measure to prevent flashback and explosions. Small volume combustion chambers, thus, are coded for a smaller metered supply, and smaller metering strokes of a gas supply valve than chambers of high volume. The coding, thus, can be utilized to provide a command filling pressure and a command filled gas volume for the metering system. The coding system, thus, has the advantage that the metering of the respective gases, introduced under substantial compression, is controlled directly by the particular chamber being used. The compression of the respective gas components is the same and, towards the end of the fill of the combustion chamber, will conform to the pressure within the chamber which is necessary for optimum operation of the combustion event. With increase of pressure, the heat liberated, per unit volume, increases. The quantity of gas to be filled by the metering and pressurization valves, for example reciprocating valves injecting a predetermined quantity of combustion gas and oxygen, respectively, thus can be controlled to provide the appropriate quantity in dependences on the particular chamber then in operation.

Suitable gases, to be mixed with oxygen, are natural gas, methane or hydrogen.

In accordance with a preferred feature of the invention, the coding system utilizes slideable coding bolts, and/or cam surfaces, located on the working chamber and providing output signals, for example by position, characterizing the respective data to be sensed, which then can be sensed by suitable pickups or sensors. This provides a simple arrangement in which the overall system can readily be associated with a coding system insuring safe and optimum operating procedures, although various sizes of work chambers can be used, having substantial differences between themselves.

Safety is further enhanced, in accordance with the preferred feature of the invention, by so arranging the chambers and the adapters that only associated adapters and chambers can be fitted together unambiguously so that, for example, an axially long adapter cannot be associated with an axially long combustion chamber.

The system is not restricted to thermal deburring apparatus; similar apparatus can be used for other purposes, for example for treating foamed articles, see for example German Pat. No. 1,504,096, or to remove connecting pores in porous structures, see for example German Pat. No. 2,322,760. The present invention, thus, is particularly directed to sets of chambers which permits treatment of the workpiece within the chamber by an explosive gaseous mixture.

DRAWINGS

FIGS. 1, 2, and 3 are front views, in high schematic form, of the apparatus in accordance with the present invention in which FIGS. 1, 2 and 3 shows different sizes of combustion chambers of sets, together with their respective adapters installed in the apparatus.

DETAILED DESCRIPTION

Figure 3:
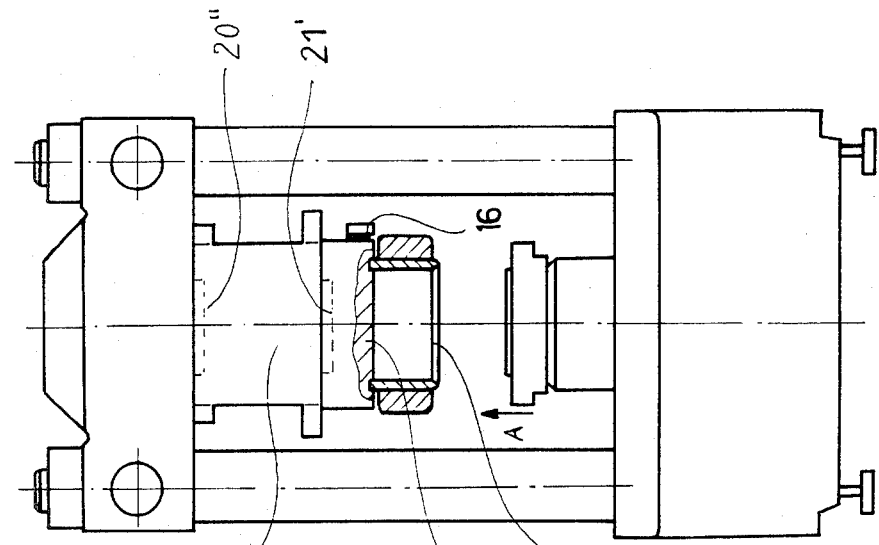
Figure 2:
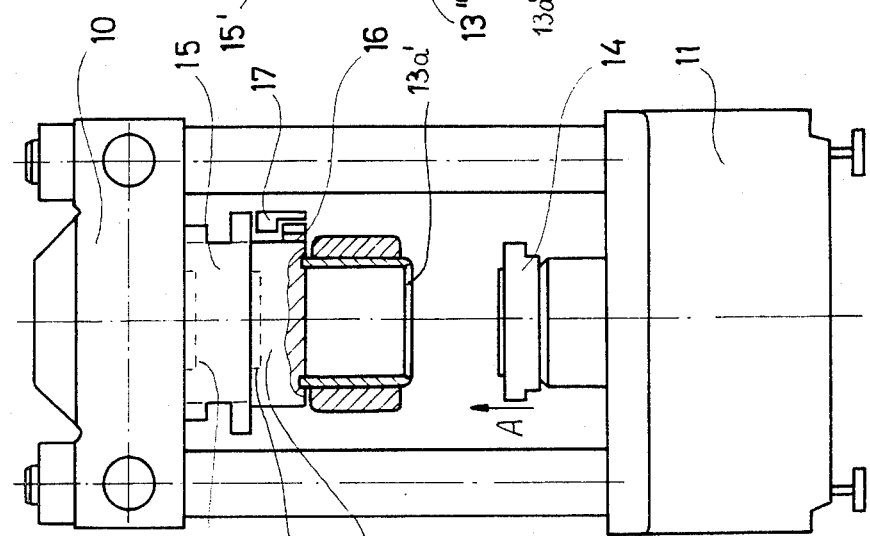
Figure 1:
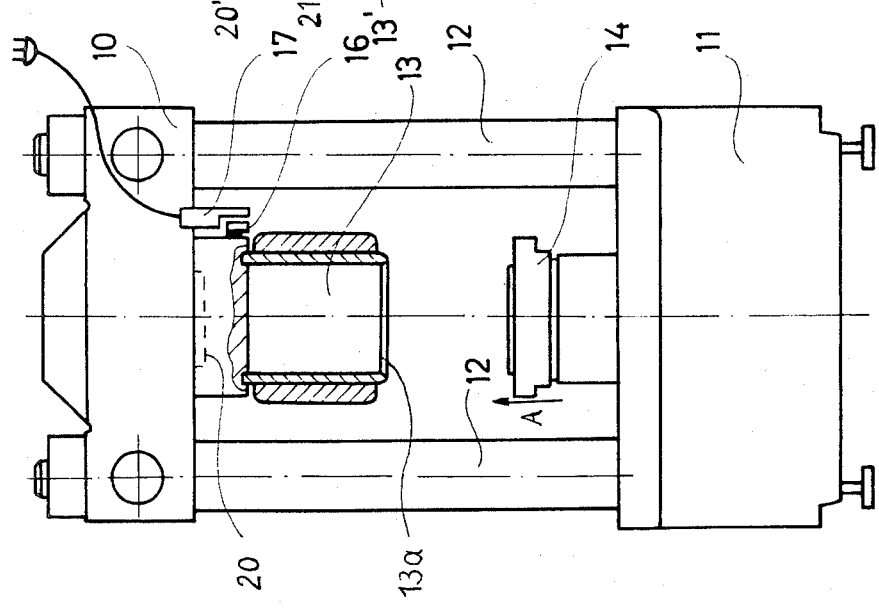

The invention will be described in connection with thermal deburring apparatus. The structure is shown in FIGS. 1-3 in the "portal" form, that is, two upright columns 12 supported on a base 11 and connected at the top by cross member 10. Of course, the present invention can be used with other types of frames, for example a C-frame, having an open throat, and only one upright column.

The column 12 include interiorily thereof tension bolts, connecting the cross element 10 to the base 11. The machine is designed to accept the deburring chamber, the closure and sealing forces applied thereon, as well as the explosion pressures occurring upon ignition of the gas mixture within the deburring chamber within the range of elastic deformation on the structural elements.

A deburring chamber 13 is secured to the cross member 10 of the frame. The lower frame element 11 carries the closure plate 14 which is upwardly moveable by a suitable hydraulic positioning system within the base 11, and not specifically shown herein. Arrow A schematically indicates the upward movement of the plate 14. The upward movement of the plate 14, on which the workpieces are positioned, then is used to close the chamber 13 by effecting a sealing connection between the plate 14 and the lower edge 13a of the chamber 13.

The appropriate quantity of gas, formed by the component of combustion gas and oxygen is derived from a gas metering cylinder—not shown—, and applied to the deburring chamber 13 in accurately measured quantity. It is hydraulically injected within the chamber 13 by an injection pump. The gases can be mixed in a mixing block, and are ignited within the chamber 13, for example by an electrical spark. Reference is made to the copending application Ser. No. 461,185; filed Jan. 26, 1983, Martini describing apparatus and method to fill the chamber. Other methods and apparatus may be used, for example the mixing block, and mixing block valves known in the prior art.

The structure of FIG. 2 is identical to that of FIG. 1; a smaller deburring chamber 13', however, is used and, in order to accommodate the smaller chamber with an appropriate stroke of the hydraulic lifting device moving the plate 14, an adapter 15 is interposed between the deburring chamber 13' and the cross element 10 of the machine frame. Of course, the stroke of the lifting device for plate 14 can be variable; if, however, the deburring chamber 13' is substantially smaller than deburring chamber 13 (FIG. 1) the stroke or excursion of the hydraulic apparatus moving the plate 14 upwardly may be too limited, i.e. insufficient in order to securely and reliably close off the chamber 13' unless the adapter 15 is interposed.

Use of the adapter, thus, permits constructing a single machine frame with single unitary sizes of columns 12, of unvarying height. For centering, the same principle as that of well-known deburring chamber structures is used. A recess 20 in the upper portion of the deburring chamber 13 is used as a centering surface. A similar projection-and-recess arrangement 20' is located at the upper end of the adapter 15. At the lower end 21, however, the adapter 15 will be formed with a centering disc, or centering recess which is dimensioned to receive only the respective centering recess, or projection, respectively, of the particular deburring chamber 13'. Thus, unambiguous association of the adapter and the respective deburring chamber, by unambiguously matching projection-and-recess arrangement is insured.

FIG. 3 illustrates yet another arrangement in which a substantially larger adapter 15' is used with a deburring chamber 13" of minimum size. The connecting flanges of the deburring chambers 13, 13' and 13" are matched to the machine frame 10, and the adapters 15', 15", respectively. The adapters and chambers all have centering surfaces 20", 21' for precise fit. Mechanical interengaging fitting surfaces, for example different diameters of projecting ridges and grooves between the chamber 13" and adapter 15'; 13' and adapter 15, respectively, insure unambiguous association. It is thus not possible to associate, for example, the adapter 15' with the chamber 13, or the chamber 13'.

In accordance with a feature of the invention, a coding system including a coding head 16 and a reading head 17 are provided. The coding head is used to set, and erase information, for example by depression of coding bolts in a coding memory unit. The reading head 17 is used to sense and evaluate the information contained in the coding head, for example by the extent of projection of respective bolts. Such an information sensing system is well known from assembly technology, is simple, and is reliable.

Such a coding system, when combined in the set of the chambers and adapters of the present invention has the additional advantage that the coding system not only can predetermine the appropriate association of adapters and chambers, or of the chamber directly on the frame, but additionally can be utilized to command necessary operating parameters, such as volume of the fill of the respective gases, and pressure of the filling gas, all associated with the respectively different deburring chambers 13, 13', 13" . . . respectively. Thus, the operating parameters associated with the respective chambers can be predetermined or precoded or preprogrammed. Accordingly, each deburring chamber has a coding head 16 of differently coded bolts, for example, which are scanned by the reading head 17, so that the appropriate fill volume and pressure will be commanded.

The reading head 17 can be collected on the coding head 16, so that for any apparatus, only a single reading head 17 is necessary, which senses and scans the information content of the respectively programmed coding heads—in dependence on the size of the respective coding chamber. As shown, the coding head 17 is connected to an external evaluation circuitry by a flexible cable, and separable from the machine itself, for association with the respective coding head 16, secured to the respective chambers 13, 13' . . . .

The information in the coding system is primarily used to control the metering, that is, quantity of gas and pressure of the gas, for, respectively, combustion gas and oxygen, so that, even dependence on the size of the deburring chamber 13, 13' . . . the appropriate volume of gas and the appropriate fill pressure will be controlled.

It is not necessary that the lower edges 13a, 13'a, 13"z of the deburring chamber 13, 13', 13" . . . are all on the same level. As shown, the levels may be different. Yet, all should be so arranged that they are clearly within the stroke of the hydraulic lifting apparatus associated with the plate 14 to the lift the plate 14 against the respective deburring chamber in the direction of the arrow A.

We claim:

1. High-temperature high-pressure workpiece treatment system comprising
    an apparatus frame having a lower frame element (11) forming a base, an upper frame element (10) located above the base, and a connecting column (12) securing the upper frame element above the lower frame element with predetermined spacing;
    a worktable (14) movable (A) upwardly from the base towards the upper frame element for a limited distance and substantially less than the predetermined spacing;
    and comprising, in accordance with the invention,
    a set of essentially bell or inverted cup-shaped chamber structures (13, 13' . . . ) of different lengths, each structure having upper and lower surfaces and fitting within said frame; and
    a set of spacing adapters (15, 15') having upper and lower adapter surfaces fitted between the respective chamber of a set and the upper frame element (10) to permit positioning of the lower surface (13a, 13'a . . . ) of the respective chamber structure within a range of operating movement of said worktable, regardless of the actual length of the specific chamber structure then installed in said frame.

2. System according to claim 1 wherein the upper frame element (10), the upper surfaces of each of the chamber structures of the set, and matching adapter surfaces of each of the adapters of the set are formed with matching, interengaging centering projection-and-recess surfaces (20,21' . . . 21,21').

3. System according to claim 2 wherein the upper surfaces of each of the chambers of the set, and the lower surfaces of each of the adapters of the set are formed with interengaging projection-and-recess means (21,21'),
    and the interengaging projection-and-recess means are of respectively different sizes for different adapter-chamber structure combinations to prevent mismatch and installation of prohibited combinations of chamber and adapter structures in the system.

4. System according to claim 1 wherein each one of the chambers of the set includes means (16) for generating a code uniquely associated with the respective chamber;
    and code sensing means (17) are provided for sensing the unique code associated with the unique chambers of the set.

5. System according to claim 4 wherein said coding means comprises a code carrying element (16) on the respective chambers of the set;
    and a single reading head (17) operatively associated with the frame of the machine to scan or read the code carried by the code carrying element and associated with the respective chamber then installed in the machine.

6. System according to claim 5 wherein said code includes information representative of operating parameters for the operation of the system.

7. System according to claim 6 wherein the operating parameters comprise: gas filling pressure; gas filling quantity;

and the coding system is arranged to uniquely program a gas filling valve for supplying the appropriate quantity of gas at the appropriate pressure for the unique chamber of the set then installed in the frame of the machine.

8. System according to claim 1 wherein the frame of the machine comprises two upright columns (12) secured to the lower frame portion (11) of the machine, and the upper frame element (10) spans said columns (12).

* * * * *